Sept. 25, 1934.   J. C. WHEELHOUSE   1,975,030
PACKLESS VALVE
Filed Oct. 15, 1931
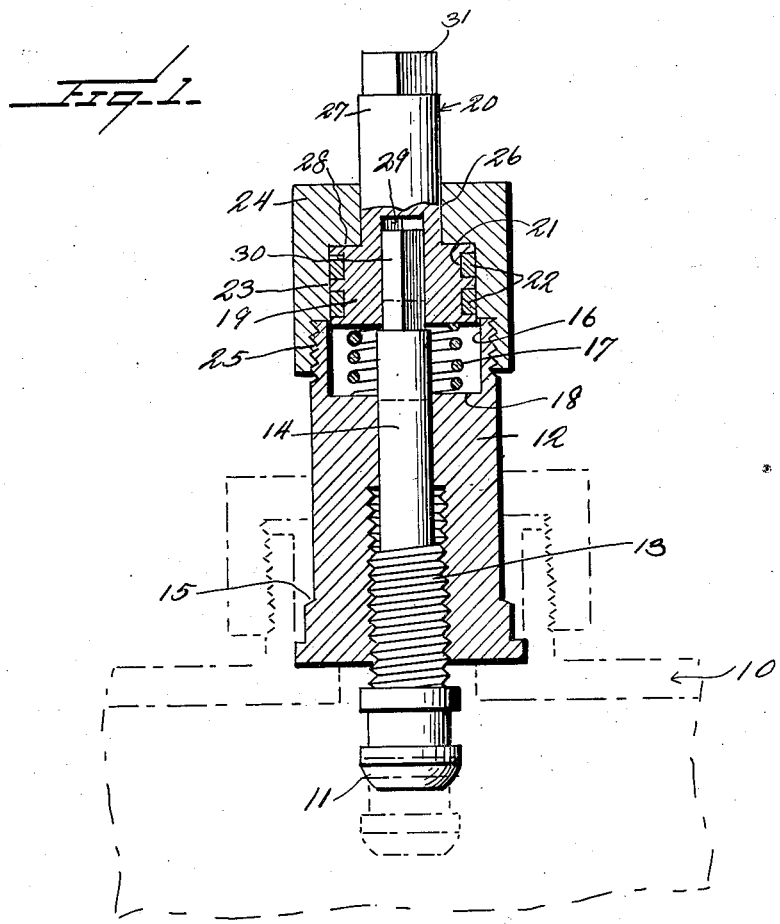
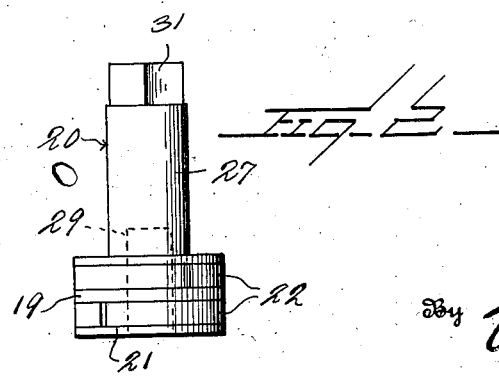
Inventor
J. C. Wheelhouse
By Watson E. Coleman
Attorney Patented Sept. 25, 1934

1,975,030

UNITED STATES PATENT OFFICE 1,975,030

PACKLESS VALVE

John C. Wheelhouse, Salt Lake City, Utah

Application October 15, 1931, Serial No. 569,068

4 Claims. (Cl. 251—48)

This invention relates to valve constructions, and more particularly to an improved valve construction which eliminates the use of packings about the valve stem while preventing the leakage of material in the form of air, liquids, vapors or the like, around the valve stem.

An object of this invention is to provide an improved valve construction which may be used with any type of either globe or gate valves, and which may be mounted in the present valve housings without in any way disturbing the present construction of the housing.

Another object of this invention is to provide a valve construction wherein the valve stem is formed into two parts, one part telescoping into the other and being movable longitudinally of the other part coactive with the rotation of both of the parts.

A further object of this invention is to provide an improved valve of this type which, due to the elimination of any packing about the valve stem, will eliminate the necessity of the frequent replacement of the packing and the resultant shutdown of portions of the factory until the leakage in the valve stem has been repaired.

A still further object of this invention is to provide a valve construction of this kind wherein the exposed stem portion is relatively short so that the stem will not readily become bent or otherwise injured.

The above and various other objects and advantages of this invention will in part be described in and in part be understood from the following detailed description of the present preferred embodiment, the same being illustrated in the accompanying drawing, wherein:—

Figure 1 is a longitudinal section partly in detail of a device constructed according to the preferred embodiment of this invention, and Figure 2 is a detail side elevation of the stem operating member.

Referring to the drawing wherein like numerals of reference designate corresponding parts throughout the several views, the numeral 10 designates generally a conventional valve housing or casing for housing a conventional valve construction of either the globe or the gate type, and the numeral 11 designates generally a valve head or member for opening or closing of the passage through the valve housing.

In valves at present in use, the stem of the valve is fixedly secured to the valve head or body and rotation of the stem is accompanied by longitudinal movement of the stem, so as to carry the valve either toward or away from the valve seat. In valve constructions of this kind, it is necessary to use a packing gland and suitable packing means within the gland and about the stem so as to prevent the passage of liquids, vapor or the like, while permitting the rotation of the valve stem.

In order to eliminate the necessity of using the valve packings, I have provided a casing 12 within which the valve stem 14 of the valve 11 is rotatably mounted, this stem 14 being provided with peripheral threads 13, so as to effect longitudinal movement of the stem and the valve proper upon rotation thereof. The casing 12 has a shoulder 15 for engagement with a gland member which is used for securing the casing 12 onto the valve housing 10.

This casing 12 is provided adjacent its upper or outer end with an enlarged bore 16 within which a spring 17 is positioned, this spring being loosely disposed about the upper end of the valve stem 14. One end of the spring 17 engages against the shoulder 18 formed by the enlarged bore 17 and the opposite end engages against the inner enlarged end portion 19 of a rotatable valve stem operating member, generally designated as 20. This enlarged end portion or head 19 of the stem operating member 20 is provided with peripheral grooves 21 within which are positioned ring members 22 which resiliently engage against the wall of the bore 23 in a gland member or cap 24.

The gland member 24 has interior threads 25 engaging peripheral threads carried by the upper end of the casing 12, and is also provided with a bore 26 through which the stem portion 27 of the valve operating member 20 extends. The bore 26 is smaller in diameter than the bore 23, thereby forming a shoulder 28 against which the head portion 19 engages, this head 19 being resiliently held against the shoulder 28 by means of the expanding spring 17. The head portion 19 is provided with a socket 29 for slidably receiving the upper end portion 30 of the stem 14. The outer end of the stem 27 has an angular portion 31 on which a conventional hand wheel or operating member may be mounted so as to effect rotation of the stem 27.

While I have shown the shoulder 28 as being relatively flat, I do not wish to be limited to this particular construction, as this shoulder 28 may be formed of substantially frustro-conical configuration and the upper end portion of the head 19 also formed of frustro-conical configuration, so as to properly seat on this shoulder or seat member 28. If desired, this connection may be of the ball and socket type or a fibre member inserted between the head 19 and the shoulder or seat 28, so as to eliminate the contact of two metals, one of which rotates with respect to the other. The ring members 22 are of such construction that they will seal the head portion 19 in the bore 23 and prevent longitudinal movement of the head 19 in normal operation while permitting rotation thereof so as to effect rotation of the stem 14 and the valve 11.

In the operation of this device, the casing 12 may be secured to the valve housing 10 by means of the conventional gland construction so that the casing 12 will take the place of the conventional valve bonnet. Upon rotation of the stem operating member 20, the stem 14 will be rotated and moved longitudinally of the casing 12, whereas the valve stem operating member 20 will not likewise move longitudinally of the casing 10.

The split rings 22 which are disposed in the grooves 21 of the socket member 19 are of such construction and tension that they will yieldably hold the socket member 19 against longitudinal movement relative to the cap or gland 24 while at the same time permitting relatively free rotation of the socket member 19 within the cap or gland 24. The spring 17 will maintain at all times the socket member 19 in its outermost position or in contact with the top of the cap or gland 24, so that a seat 28 may be formed in the cap or gland 24 which is engaged by the top of the socket member 19, and which will coact with the resilient sealing members 24 in preventing the passage of steam, vapor or the like through the reduced bore 26 in the cap or gland 24.

It will be obvious, from the foregoing, that any steam, vapor or the like leaking past the threads 13 of the valve stem 14 will pass outwardly into the bore 16 and be retained in there by means of the packing rings 22 which will prevent the passage of the vapors or liquids through the reduced bore 26. The valve construction herein disclosed may be so constructed that it will take the place of any valve construction for a conventional or standard type of gate or globe valve, and is so constructed that the conventional housing 10 of the valve need not be altered in order to accommodate the improved valve construction hereinbefore described. The end portion 30 of the valve stem 14 is of such length and the socket or recess 29 of such depth, as to permit the entire opening and closing of the valve 11.

It will be noted from the drawing that the stem portion 27 of the valve stem operating member 20 is relatively short, this being desirable so that the stem portion 27 will not readily become bent or otherwise injured as is frequently the case in the valve stem constructions at present in use, wherein the valve stem is made relatively long owing to the longitudinal movement of the exposed portion of the stem. If desired, suitable packing means may be interposed between the upper end portion of the housing 12 and the gland member 24 so as to prevent the passage of any liquids or vapors about the threads 25.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. In a valve construction including a valve and a stem, a housing disposed about the stem, a gland threadably carried by the housing, a shaft rotatably carried by the gland, a socket member formed with the shaft and disposed within the gland and movable longitudinally in the gland and housing, said socket member loosely engaging one end of the stem, said socket member also having a peripheral groove therein, and a sealing ring loosely positioned within the groove and yieldably maintaining the socket member in the gland against longitudinal movement while permitting rotary movement thereof.

2. In a valve construction including a gland member, a shaft rotatably carried by the gland, a socket member formed with the shaft and movable longitudinally in the gland, said socket member having a peripheral groove therein, and a split ring yieldably mounted within the groove and engaging the inner wall of the gland whereby to yieldably maintain the socket member in the gland against longitudinal movement while permitting rotary movement thereof and to seal the member within the gland.

3. In a valve construction comprising the combination with a valve stem, of a housing adapted to enclose the stem, said stem having longitudinal and rotary movement within the housing, a shaft disposed axially of the stem and extending outwardly of one end of the housing, a socket member carried by the shaft and disposed within the housing and engaging the stem whereby to rotate the stem upon rotation of the shaft, said socket permitting longitudinal movement of the stem coactive with the rotation of the stem, and yieldable sealing means carried by the periphery of the socket and engaging the housing, said sealing means yieldably holding said socket member against longitudinal movement while permitting free rotation thereof.

4. In a valve construction including a valve and a stem, a housing disposed about the stem, a cap threadably carried by the housing, a shaft rotatably carried by the cap, a socket member carried by the inner end of the shaft and slidably engaging the stem, said socket member having peripheral grooves therein yieldable sealing means disposed in the grooves of the member and engaging the cap to seal the member within the cap, and yieldably hold the member against longitudinal movement in the housing while permitting free rotation of the member, and a spring engaging against the inner end of the member for holding the outer end of the member in contact with the cap.

JOHN C. WHEELHOUSE.